United States Patent
Moorlag et al.

(10) Patent No.: US 7,935,768 B2
(45) Date of Patent: May 3, 2011

(54) COATING COMPOSITIONS HAVING CROSSLINKED FLUOROAROMATIC POLYMERS

(75) Inventors: Carolyn Moorlag, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 65 days.

(21) Appl. No.: 12/181,405

(22) Filed: Jul. 29, 2008

(65) Prior Publication Data
US 2010/0029856 A1 Feb. 4, 2010

(51) Int. Cl.
*C08L 71/12* (2006.01)
(52) U.S. Cl. ........ 525/390; 525/416; 525/534; 525/535; 528/86; 528/171; 528/174; 528/219; 528/397; 528/401
(58) Field of Classification Search .......... 525/390, 525/416, 534, 535; 528/86, 171, 174, 219, 528/401, 397
See application file for complete search history.

(56) References Cited

U.S. PATENT DOCUMENTS

| | | | |
|---|---|---|---|
| 4,777,087 A | 10/1988 | Heeks et al. | |
| 5,501,881 A | 3/1996 | Fuller et al. | |
| 5,512,409 A | 4/1996 | Henry et al. | |
| 5,729,813 A | 3/1998 | Eddy et al. | |
| 6,313,185 B1 | 11/2001 | Lau et al. | |
| 7,127,205 B2 | 10/2006 | Gervasi et al. | |
| 2005/0245693 A1* | 11/2005 | Bhatt | 525/416 |
| 2005/0288483 A1 | 12/2005 | Ding et al. | |

OTHER PUBLICATIONS

Shi, Q.Z.; Synthesis and Characterization of Proton Conducting, Fluorine-Containing Block Copolymers, 2004, p. 116-121.*
DuPont; Bisphenol AF Technical Information, Oct. 26, 2006, p. 1-3.*
Ding, J. et al; Macromolecules, 2007, 40, p. 3145-3153.*

* cited by examiner

*Primary Examiner* — David Wu
*Assistant Examiner* — Robert Jones
(74) *Attorney, Agent, or Firm* — MH2 Technology Law Group LLP

(57) ABSTRACT

A crosslinked fluoroaromatic polymer having at least one crosslinked fluoropolymer chain and at least one fluorinated aromatic segment, wherein the crosslinked fluoropolymer chain is crosslinked to the fluorinated aromatic segment via a nucleophilic curing agent, and processes for preparation thereof.

9 Claims, 1 Drawing Sheet

COATING COMPOSITIONS HAVING CROSSLINKED FLUOROAROMATIC POLYMERS

CROSS REFERENCE TO RELATED APPLICATIONS

Attention is directed to U.S. application Ser. No. 12/181,388, filed Jul. 29, 2008, entitled "Fuser Member Coating Having Aliphatic-Aromatic Fluoropolymers." The subject matter of this application is hereby incorporated by reference in its entirety.

BACKGROUND

The disclosed embodiments generally relate to the field of fluoropolymers, and to the preparation and use of fluoroaromatic polymers. Fluoroaromatic polymers may be crosslinked to give an elastomeric material that may be useful for applications, such as, for example, applying a top layer coating onto an electrostatographic component such as a roll or belt used in printing and copying operations. An example is an outer coating for a fuser roller or fuser belt. Such crosslinked fluoroaromatic polymers may be useful in non-porous applications.

U.S. Pat. No. 7,127,205, which is hereby incorporated by reference in its entirety, provides a process for providing an elastomer surface on a fusing system member. Generally, the process includes forming a solvent solution/dispersion by mixing a fluoroelastomer dissolved in a solvent such as methyl ethyl ketone and methyl isobutyl ketone, a dehydrofluorinating agent such as a base, for example the basic metal oxides, MgO and/or $Ca(OH)_2$, and a nucleophilic curing agent such as VC-50 which incorporates an accelerator and a crosslinking agent, and coating the solvent solution/dispersion onto the substrate. Commonly used fluoropolymer crosslinkers are bisphenol-A and bisphenol AF that are known to react with unsaturated positions on fluoropolymer chains. The surface is then stepwise heat cured. Prior to the stepwise heat curing, ball milling is usually performed for from 2 to 24 hours.

A new material system for fusing or for other applications is desired that exhibits improved mechanical properties such as wear, and modified surface interactions to improve release and reduce or eliminate the use of fuser oil or other oil materials in other applications. Improving these properties would extend life of the component. Aliphatic-aromatic fluoropolymers incorporate the heat resistance and release properties of fluoropolymers, with the high modulus of stiff aromatic ring components and the flexibility of aliphatic chain components, whereby modifying ratios of the two components can be used to tailor properties. The mixed aliphatic-aromatic fluoropolymers contain a crosslinkable component and can be crosslinked using nucleophilic crosslinking agents. This results in elastomeric character of the material, and mechanical robustness.

In addition, an improved method of crosslinking polymeric materials, such as aromatic compositions, and especially fluoroaromatic compositions, to produce strong and robust polymer coatings for various applications is desired. U.S. Pat. No. 6,313,185 discloses a method of crosslinking nanoporous materials using diene and dienophile backbones is disclosed.

However, an improved method of crosslinking of aromatic compositions, and specifically, fluoroaromatic compositions is desired. An improved method for crosslinking aromatic compositions to be useful in non-porous polymeric applications is also desired. Enclosed herein is a crosslinking method that can be carried out under air ambient conditions using common, commercially available nucleophilic crosslinking agents. Ease of processing can be improved, and the cost reduced as compared with air sensitive crosslinking methods such as peroxide induced crosslinking.

SUMMARY

Embodiments include a crosslinked fluoroaromatic polymer having at least one crosslinked fluoropolymer chain and at least one fluorinated aromatic segment, wherein the crosslinked fluoropolymer chain is crosslinked to the fluorinated aromatic segment via a nucleophilic curing agent.

In addition, embodiments a crosslinked fluoroaromatic polymer selected from the group consisting of the following Formulas III and IV:

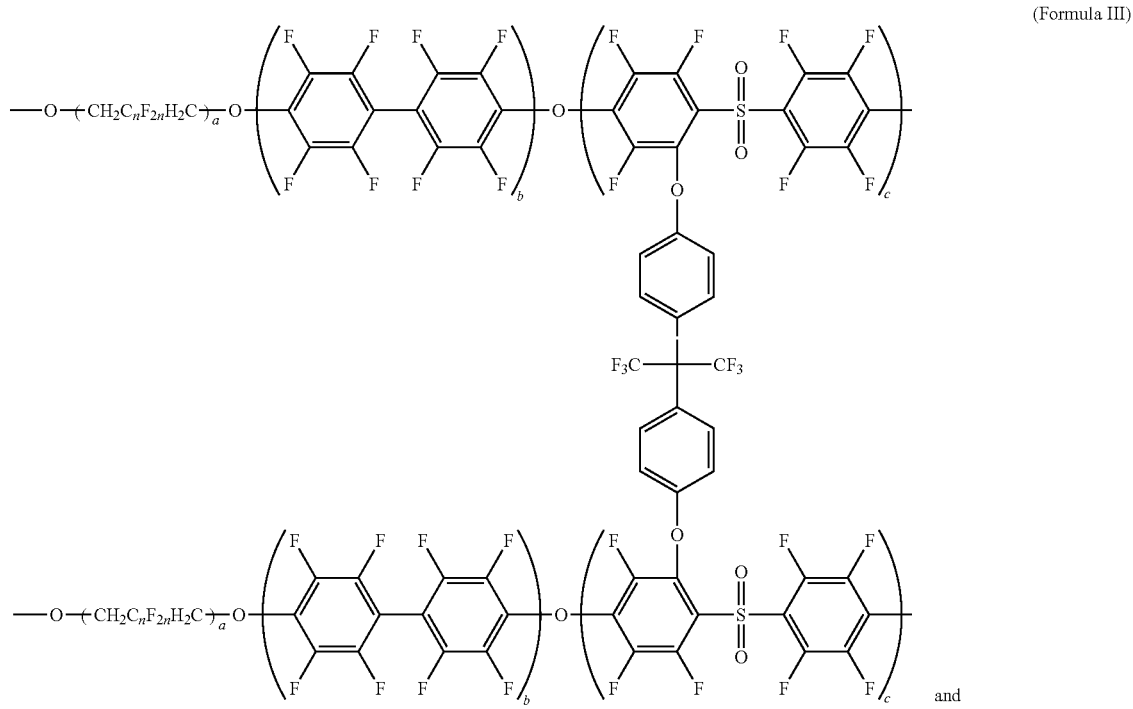

(Formula III)

and

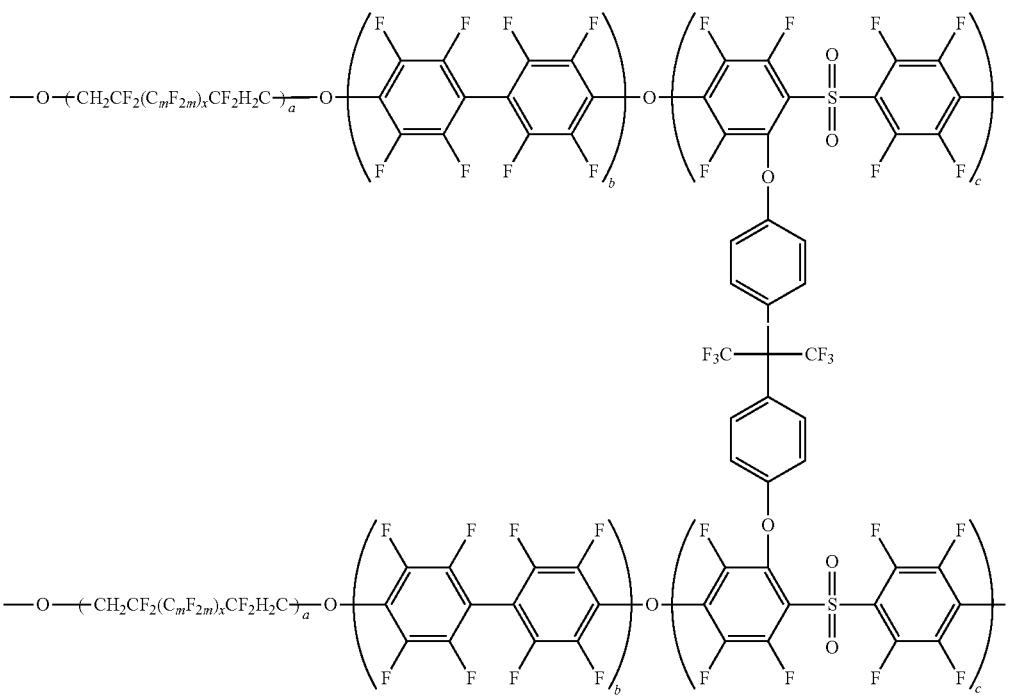

(Formula IV)

wherein in Formulas III and IV above, $C_nF_{2n}$ and $C_mF_{2m}$ are both a linear or branched perfluorocarbon chain, n is a number of from about 1 to about 100, m is a number of from about 1 to about 6, x is a number of from about 1 to about 500, and a, b, and c are molar ratios wherein a is a number of from about 0.25 to about 0.75, b is a number of from about 0.25 to about 0.75, c is a number of from about 0.01 to about 0.25, and a+b+c=1

Embodiments further include a process for producing a crosslinked fluoroaromatic polymer having at least one crosslinked fluoropolymer chain and at least one fluorinated aromatic segment, wherein the crosslinked fluoropolymer chain is crosslinked to the fluorinated aromatic segment via a nucleophilic curing agent, the process including mixing and reacting a fluoropolymer chain and a fluorinated aromatic segment with a) a nucleophilic curing agent selected from the group consisting of a bisphenol, a diamine, a masked diamine, and an aminosilane, and b) a metal catalyst, wherein the nucleophilic curing agent is crosslinked to the fluoropolymer chains by nucleophilic substitution at fluorinated aromatic positions of the fluoropolymer chains.

BRIEF DESCRIPTION OF THE DRAWINGS

The above embodiments will become apparent as the following description proceeds upon reference to the drawings, which include the following figures.

DETAILED DESCRIPTION

Embodiments herein describe crosslinked fluoroaromatic polymers that can be useful in many coating applications requiring robust coatings, and for example, a fuser member coating. The fluoroaromatic polymers comprise fluorinated aromatic repeat units covalently bonded together. Also embodied herein are crosslinked fluoroelastomers resulting from the addition of crosslinking agents that become bonded to fluoropolymer chains. A networked system results from thermal curing of fluoroaromatic polymers mixed with crosslinking agents and other chemical components that enable crosslinking.

In embodiments, the fluoroaromatic polymers comprise aliphatic-aromatic fluoropolymers, where monomeric repeat units are selected from the group consisting of fluorinated aliphatic segments and fluorinated aromatic segments. The aliphatic and aromatic monomeric repeat units are covalently bonded together. It is expected that fluoropolymer properties are tunable by varied levels of incorporation of fluorinated flexible and fluorinated rigid segments. By tuning the properties, it is expected that the crosslinked aliphatic-aromatic fluoropolymers would display desirable mechanical properties and improved life of the coating.

Figure 1:
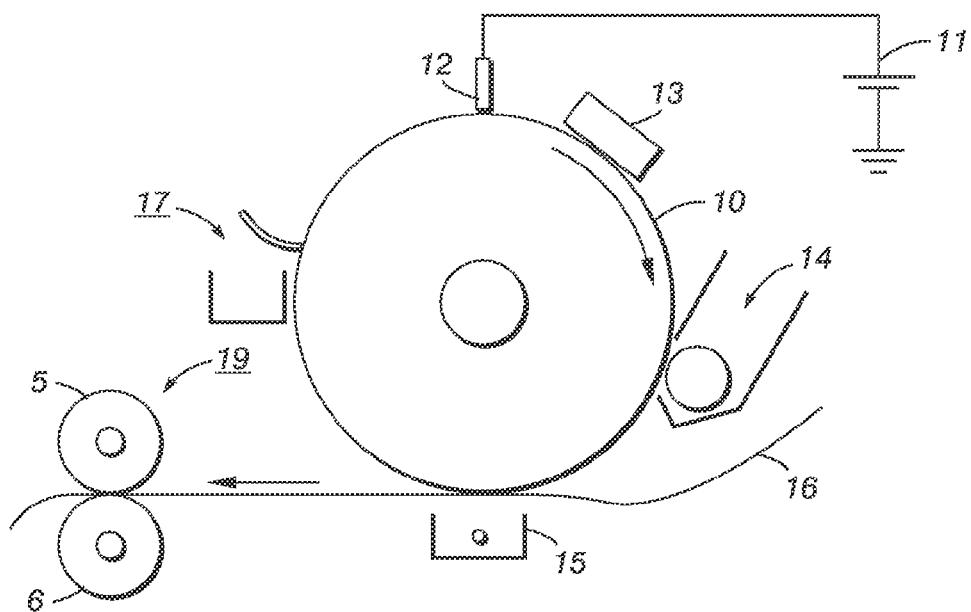
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 5 and pressure member 6, thereby forming a permanent image. Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
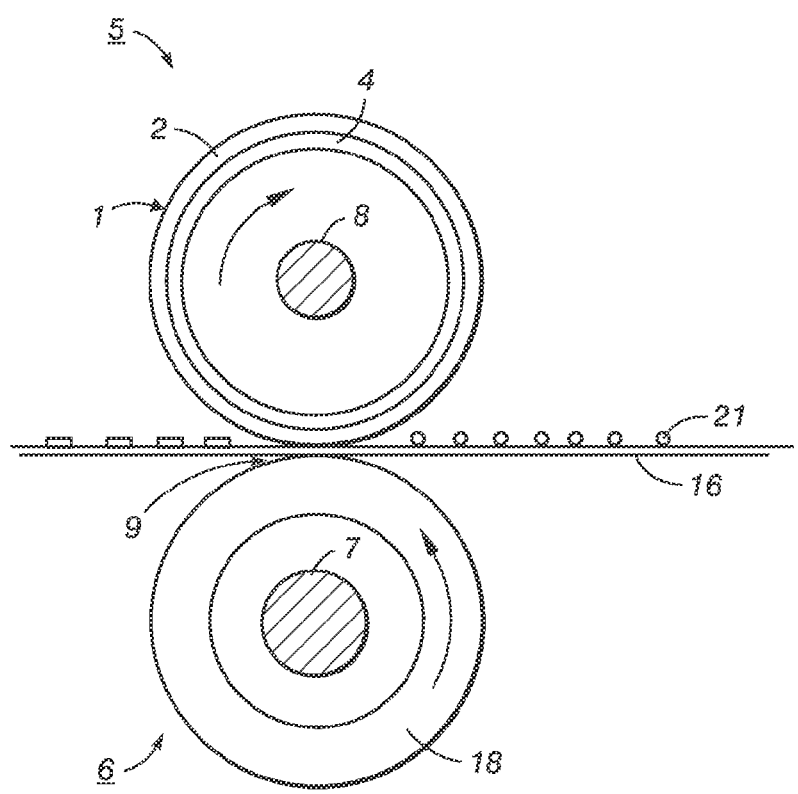
FIG. 2 is a sectional view of a fusing assembly in accordance with one embodiment disclosed herein.

In FIG. 2, fuser roller 5 can be a hollow cylinder or core fabricated from any suitable metal, such as aluminum, anodized aluminum, steel, nickel, copper, and the like, having a suitable heating element 8 disposed in the hollow portion thereof which is coextensive with the cylinder.

Backup or pressure roll 6 cooperates with fuser roll 5 to form a nip or contact arc 9 through which a copy paper or other substrate 16 passes such that toner images 21 thereon contact surface 2 of fuser roll 5. As shown in FIG. 2, the backup roll 6 has a rigid steel core 7 with a surface or layer 18 thereon.

Although a fuser system is shown, the coating described can be useful for many purposes, including a coating for other rollers useful in electrostatography, and can be used as a coating material in other arts.

In embodiments wherein the coating is used as an outer coating of a fuser member, the fuser system is oil-less and there is no release agent needed for fusing. No oil is applied to the fuser roller, and the release agent delivery rollers are not present in the system. However, in other embodiments of a fusing system, the system could possibly use a release agent.

The fusing, or other component can be comprised of at least three different configurations. In one embodiment, the fusing component is of a two-layer configuration as shown in FIG. 2. Fuser member 5 having heating element 8, comprises substrate 4. Positioned over the substrate 4 is outer layer 2.

In embodiments, there may be a three layer configuration with an outer layer wherein there is an intermediate layer positioned between said substrate and said outer layer. In embodiments, there may be an outer release layer, such as a liquid release oil, on the outer layer 2.

Examples of suitable substrate materials include, in the case of roller substrate, metals such as aluminum, stainless steel, steel, nickel and the like. In the case of film-type substrates (in the event the substrate is a fuser belt, film, drelt (a cross between a drum and a belt) or the like) suitable substrates include high temperature plastics that are suitable for allowing a high operating temperature (i.e., greater than about 80° C., or greater than 200° C.), and capable of exhibiting high mechanical strength.

In embodiments, the fluoropolymers herein comprise fluoroaromatic segments that are connected via a covalent bond, such as an ether, thioether, ester, sulfide or other linkage.

In embodiments, the fluoropolymers herein comprise fluoroaromatic segments and fluorinated aliphatic segments are connected via a covalent bond or linkage group, such as an ether, thioether, ester, sulfide, or other linkage.

In embodiments, the fluorinated monomeric segments are bonded through a linkage group selected from the group consisting of an ether, thioether, ester, sulfide, other organic linkages or other chemical groups.

In embodiments, fluoroaromatic segments are linear or branched aromatic carbon chains that are partially or entirely fluorinated and have a carbon number of from about 6 to about 60, or from about 12 to about 24.

Illustrative examples of fluoroaromatic segments described above include the following structures:

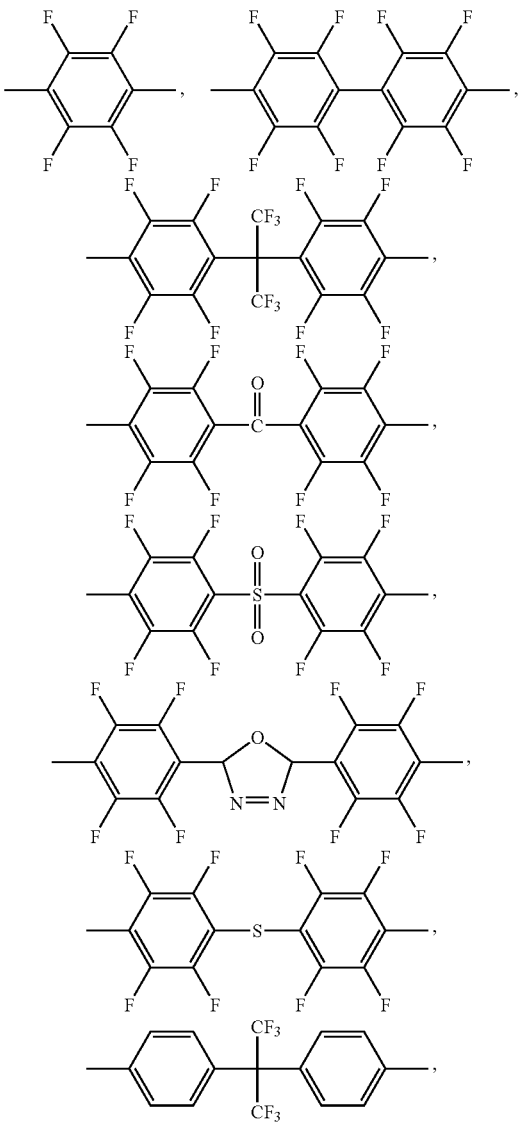

and mixtures thereof.

Fluoroaromatic segments are rigid, wherein the term "rigid" refers to a molecular segment imparting stiffness or mechanical strength to the resulting fluoropolymer material.

In embodiments, the crosslinked polymer comprises fluorinated aliphatic segments covalently attached to fluoroaromatic segments, wherein fluorinated aromatic segments are linear or branched aliphatic-based or polyether-based chain components that are partially or entirely fluorinated and have a carbon number from about 1 to about 500, or from about 10 to about 200, or from about 25 to about 75. Molecular weights include the oligomeric to polymeric range of from about 100 to about 15,000, or from about 500 to about 5,000, or from about 1200 to about 2500. Examples include a hydrocarbon component selected from the group consisting of a partially fluorinated hydrocarbon having from about 1 to about 500 carbons, or from about 1 to about 250 carbons, and a perfluorohydrocarbon having from about 1 to about 500 carbons, or from about 1 to about 250 carbons.

Fluorinated aliphatic segments are flexible, wherein the term "flexible" refers to a molecular segment imparting mechanical flexibility to the resulting fluoropolymer material.

By the incorporation of a balance of fluorinated aliphatic flexible and fluoroaromatic rigid molecular segments into fluoropolymer chains, the desired amount of mechanical flexibility and mechanical stiffness of the crosslinked fluoropolymer can be achieved.

Fluorinated aliphatic segments include partially fluorinated hydrocarbons and perfluorohydrocarbons, each having from about 1 to about 500 carbons, or from about 1 to about 300 carbons, or from about 1 to about 100 carbons.

Illustrative examples of fluorinated aliphatic segments include —($C_nF_{2n}$)—, —$CH_2$($C_nF_{2n}$)$CH_2$—, and —$CH_2CH_2$($C_nF_{2n}$)$CH_2CH_2$—, and mixtures thereof, wherein $C_nF_{2n}$ is a linear or branched perfluorocarbon chain and n is a number of from about 1 to about 500, or from about 1 to about 300, or from about 1 to about 50.

Illustrative examples of fluorinated aliphatic segments comprising perfluoroether segments include —($C_nF_{2n}O$)$_x$—, —$CH_2CF_2O$($C_nF_{2n}O$)$_xCF_2CH_2$—, —$CH_2CH_2OCH_2CF_2O$($C_nF_{2n}O$)$_xCF_2CH_2OCH_2CH_2$—, and mixtures thereof, wherein $C_nF_{2n}$ is a linear or branched perfluorocarbon chain, n is a number of from about 1 to about 6, or from about 1 to about 5, and x is a number of from about 1 to about 500, or from about 1 to about 300.

In embodiments, the fluorinated aliphatic segment comprises a perfluoropolyether component selected from the group consisting of poly(difluoromethylene oxide), poly(tetrafluoroethylene oxide), poly(hexafluoropropylene oxide), poly(tetrafluoroethylene oxide-co-difluoromethylene oxide), poly(hexafluoropropylene oxide-co-difluoromethylene oxide), and poly(tetrafluoroethylene oxide-co-hexafluoropropylene oxide-co-difluoromethylene oxide).

In embodiments, the fluorinated aliphatic segment comprises —($C_nF_{2n}O$)$_x$—, or a copolymer comprised thereof, wherein n is an integer of from 1 to about 6, or from about 1 to about 5, and x is the number of repeating units ranging from about 2 to about 500, or from about 2 to about 250.

In embodiments, the fluoroether component is random or block copolymer selected from the group consisting of:

The fluorinated aliphatic segment may comprise a monomeric repeat unit selected from the group consisting of vinylidene fluoride, tetrafluoroethylene, hexafluoropropylene, perfluoro(methyl vinyl ether), perfluoro(ethyl vinyl ether), perfluoro(propyl vinyl ether), and mixtures thereof.

In embodiments, fluoroaromatic polymers are prepared via stepwise reaction of functional groups attached to the terminated end of fluoroaromatic monomers. In embodiments, polymerization occurs by condensation reactions between functional groups. Examples of such condensation reactions include reaction of alcohols or reaction of alcohols and alkenes, in the presence of acid catalyst to form polyethers. In further embodiments, polymerization occurs by condensation of amines and carboxylic acids to form polyamides, or polymerization occurs by condensation of alcohols and carboxylic acids to form polyamides, or polymerization occurs by condensation of alcohols and carboxylic acids to form polyesters. In other embodiments, polymerization occurs by other stepwise reactions through terminal functional groups of repeat monomers.

In embodiments, fluoroaromatic segments and fluorinated aliphatic segments are copolymerizated via polymerization processes described above.

Fluoroaromatic polymers crosslinked by the addition of nucleophilic crosslinking agents.

In embodiments, suitable nucleophilic crosslinking agents for crosslinking fluoroaromatic groups include a biphenol such as hydroquinone and substituted hydroquinones, a bisphenol such as bisphenol A (2,2-bis(4-hydroxyphenyl)propane) or bisphenol AF (2,2-bis(4-hydroxyphenyl)hexafluoropropane, in commercial formulations such as VC50 from Dupont), an aminosilane such as AO700 (aminoethyl aminopropyl trimethoxysilane crosslinker from Gelest), a diamine such as hexamethylenediamine or [3-(trimethoxysilyl)propyl]-ethylenediamine and a masked diamine such as N,N'-dicinnamylidene-1,6-hexanediamine. A "masked" diamine refers to the coordination of functional groups to amine functionalities. In embodiments, a fluoropolymer is dissolved in a solvent and a crosslinking agent is added along with other components that enable crosslinking. In embodiments, the nucleophilic curing agent is crosslinked to the fluoropolymer chains by nucleophilic substitution at fluorinated aromatic positions of the fluoropolymer chains. In embodiments, the fluoropolymer chains are crosslinked by a reaction of a perfluoroarene moiety with the nucleophilic curing agent composition at a curing temperature ranging from about 50 to about 300° C., or from about 55 to about 250° C.

In a method embodiment, a crosslinked fluoroaromatic polymer is prepared by dissolving a plurality of fluoropolymer in a solvent such as methyl ethyl ketone (MIK), methyl isobutyl ketone (MIBK), or the like solvent. The solids loading can be from about 10 to about 20, or from about 15 to about 18, or about 17.5 percent by weight of total solids. The solution is mixed with surfactants such as Novec® FC-4430 (available from 3M), AKF-290 (available by Wacker), like surfactants, and/or mixtures thereof, followed by addition of basic oxides such as of magnesium oxide (for example, Elas-

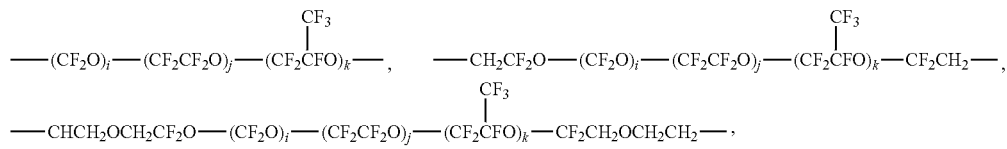

and mixtures thereof, wherein i, j, and k each represent an integer ranging from 0 to about 200, of from about 1 to about 100, and wherein the total of i+j+k is ranging from about 3 to about 600, or from about 5 to about 250.

toMag 170 Special available from Rohm and Hass, Andover, Mass.) and calcium hydroxide. To this mixture is added a crosslinker such as bisphenol AF crosslinker (for example, VC50 from Dupont).

A metal oxide catalyst can be further included to facilitate the curing reaction. A metal oxide, or basic metal oxide particles may be selected from magnesium oxide, calcium oxide, calcium hydroxide, and the like, and mixtures thereof. A filtering step may be used to remove large metal oxide particles before addition to the aliphatic-aromatic fluoropolymer mixture.

In embodiments, a fluoroaromatic polymer may comprise the following. The fluorinated aromatic repeat unit, in embodiments, may be mixtures of octafluorodiphenyl and octafluorodiphenylsulphone. A fluorinated aliphatic repeat unit, in embodiments, may be a fluorocarbon —CH$_2$(C$_n$F$_{2n}$) CH$_2$—, wherein C$_n$F$_{2n}$ is a linear or a branched perfluorocarbon chain, and n is a number of from about 2 to about 300. The flexible aliphatic repeat unit, in other embodiments, may be a perfluoroether —CH$_2$CF$_2$O(C$_n$F$_{2n}$O)$_x$CF$_2$CH$_2$—, wherein C$_n$F$_{2n}$ is a linear or branched perfluorocarbon chain, n is a number of from about 1 to about 6, and x is a number of from about 1 to about 500. The fluorinated aromatic and aliphatic repeat monomers, in embodiments, may be linked together with ether linker groups. Examples of the resulting fluoroaromatic polymer chains are represented as Formula I and Formula II:

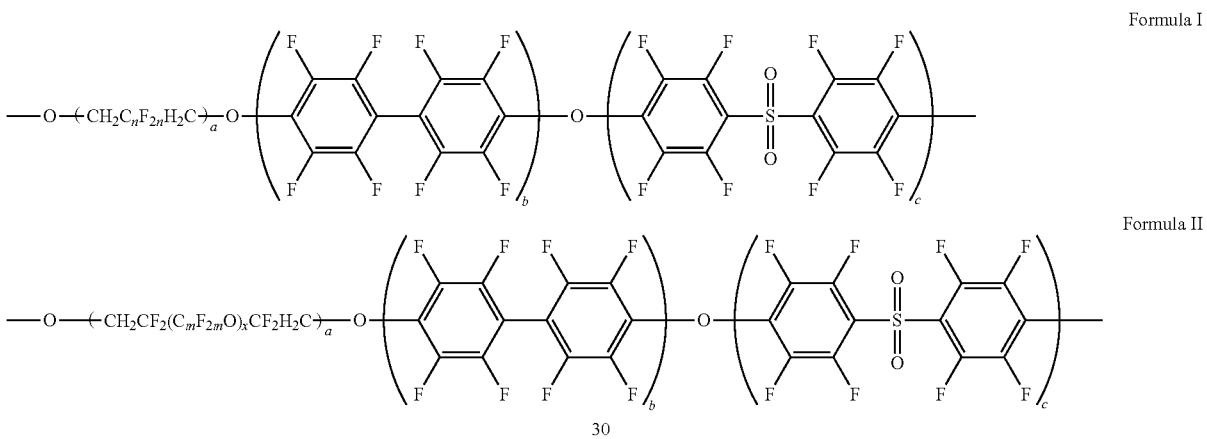

Formula I

Formula II wherein C$_n$F$_{2n}$ and C$_m$F$_{2m}$ are each a linear or branched perfluorocarbon chain, n is a number of from about 1 to about 100, or from about 1 to about 50; m is a number of from about 1 to about 6, or from about 1 to about 5; x is a number of from about 1 to about 500, or from about 1 to about 300; and a, b, and c are molar ratios wherein a is a number of from about 0.25 to about 0.75, or from about 0.3 to about 0.7; b is a number of from about 0.25 to about 0.75, or from about 0.3 to about 0.7; and c is a number of from about 0.01 to about 0.25, or from about 0.01 to about 0.2; and a+b+c=1.

In embodiments, fluoroaromatic polymers comprised of Formula I-II are crosslinked via nucleophilic substitution at saturated fluorinated positions of the fluoroaromatic rings, and reactivity to crosslinking is expected to be enhanced by proximity to the sulfone functionalities. The plurality of fluoropolymer chains are crosslinked together by the addition of VC50 crosslinking system, and it is expected that crosslinking would occur along multiple sites of fluoropolymer chains, and for a multitude of chains to yield crosslinked fluoroaromatic polymer.

In embodiments, the crosslinked fluoroaromatic polymer prepared from Formula I has the following Formula III:

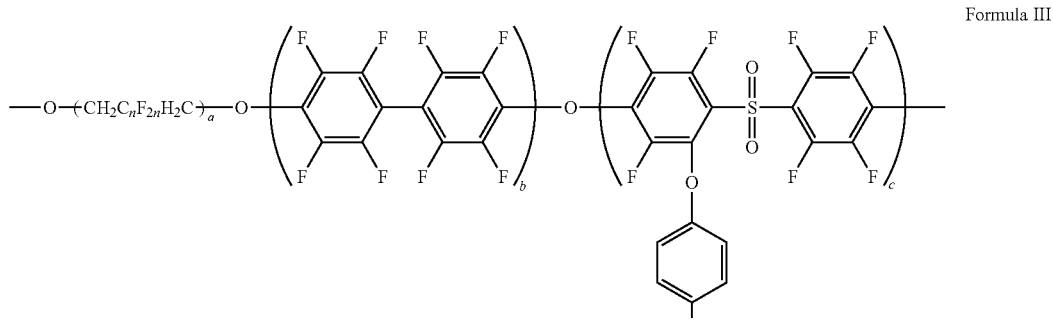

Formula III

-continued

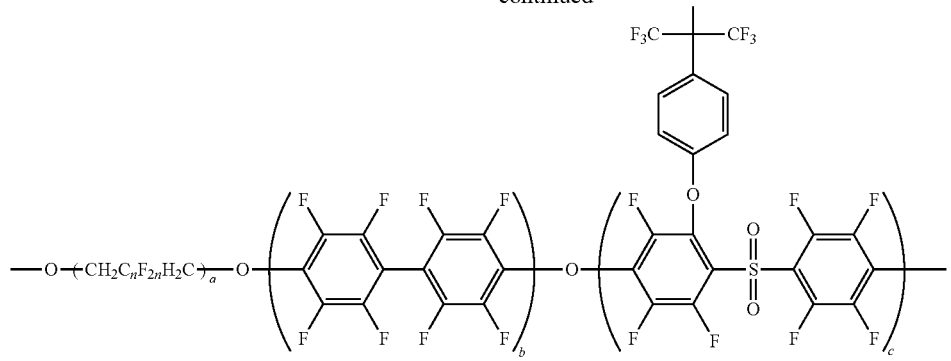

wherein $C_nF_{2n}$ is a linear or branched perfluorocarbon chain, n is a number of from about 1 to about 100, and a, b, and c are molar ratios wherein a is a number of from about 0.25 to about 0.75, b is a number of from about 0.25 to about 0.75, c is a number of from about 0.01 to about 0.25, and a+b+c=1.

In embodiments, crosslinked fluoroaromatic polymer prepared from Formula II has the following Formula IV:

Formula IV

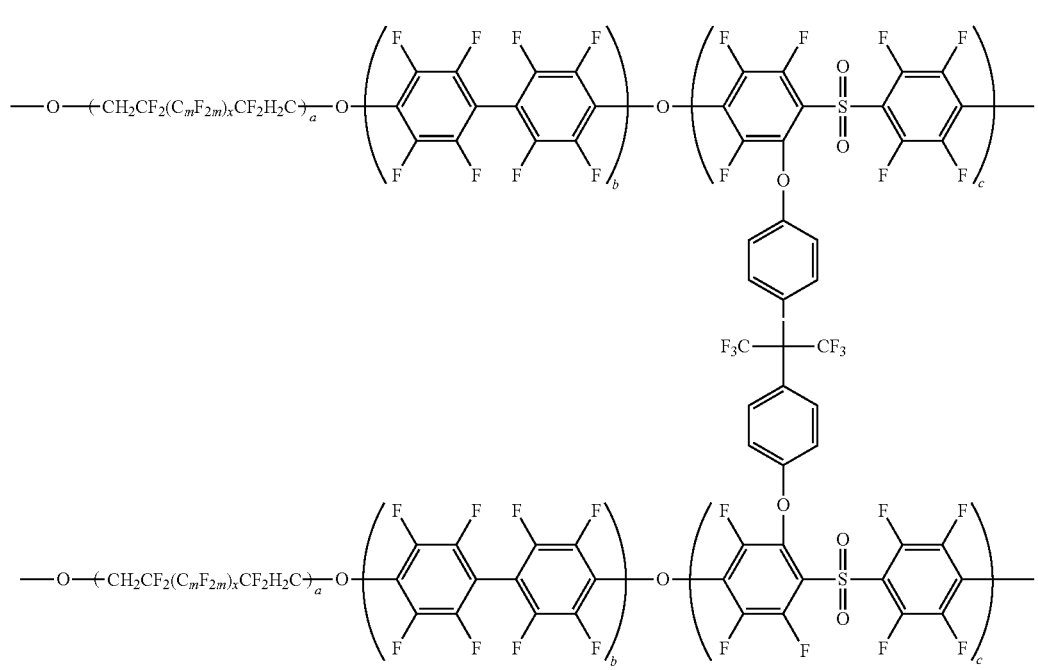

wherein $C_mF_{2m}$ is a linear or branched perfluorocarbon chain, m is a number of from about 1 to about 6, x is a number of from about 1 to about 500, and a, b, and c are molar ratios wherein a is a number of from about 0.25 to about 0.75, b is a number of from about 0.25 to about 0.75, c is a number of from about 0.01 to about 0.25, and a+b+c=1.

In embodiments, a method may further include coating the fluoroaromatic polymer onto a substrate. The fluoroaromatic polymer may be cured, and curing may be realized by heating. Examples of nucleophilic crosslinking agents include those selected from the group consisting of hexamethylenediamine, N,N'-dicinnamylidene-1,6-hexanediamine, [3-(trimethoxysilyl)propyl]-ethylenediamine, hydroquinone, substituted hydroquinones, 2,2-bis(4-hydroxyphenyl) hexafluoropropane (Bisphenol AF), and 2,2-bis(4-hydroxyphenyl)propane (Bisphenol A).

In a method embodiment, the substrate may be selected from the group consisting of polymer substrates such as plastics, silicone polymers and the like, metals, metal oxides, silicone oxides, ceramics and the like.

The outer material composition can be coated on the substrate in any suitable known manner. Typical techniques for coating such materials on a substrate include liquid and dry powder spray coating, dip coating, wire wound rod coating, fluidized bed coating, powder coating, electrostatic spraying, flow coating, sonic spraying, blade coating, and the like. In an embodiment, the aliphatic-aromatic fluoropolymer material coating is spray or flow coated to the substrate.

Heating the fluoropolymer coating may be a step curing cycle where the temperature and heating time at temperature are varied; these curing cycles for fluoroelastomers are known by persons of ordinary skill in the art. The outer layer is heat treated by stepwise heat treatment to a temperature of from about 170° C. to about 250° C., or from about 200° C. to about 240° C., or from about 218° C. to about 232° C.

In an embodiment, the outer layer may be modified by any known technique such as sanding, polishing, grinding, blasting, coating, or the like.

Embodiments herein could be used in fusing applications as a highly crosslinked fluoropolymer top coating. The extent of crosslinking could be improved compared to conventionally crosslinked VITON® fluoropolymer for fluoroaromatic polymers with a high ratio of crosslinking sites along fluoropolymer chains. In further embodiments, fluoroaromatic polymers comprising a high ratio of flexible aliphatic components that are highly crosslinked would display enhanced elasticity and mechanical properties similar to that of a silicone rubber surface and the similar match of physical properties may prevent delamination from this substrate. Increased crosslinking with improved elasticity may additionally decrease fatigue of the material.

The following Examples further define and describe embodiments herein. Unless otherwise indicated, all parts and percentages are by weight.

EXAMPLES

Example 1

Preparation of Crosslinked Fluoroaromatic Coatings

It is expected that a crosslinked fluoroaromatic coating could be prepared from a solvent solution/dispersion containing 100 parts by weight of an fluoroaromatic polymer having the following formula:

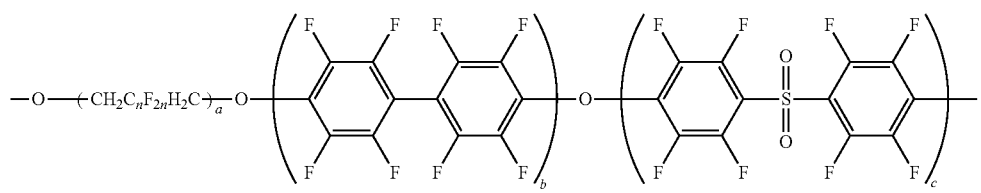

Formula I wherein $C_nF_{2n}$ is a linear or branched perfluorocarbon chain, n is a number of from about 1 to about 100, and a, b, and c are molar ratios wherein a is a number of from about 0.25 to about 0.75, b is a number of from about 0.25 to about 0.75, c is a number of from about 0.01 to about 0.25, and a+b+c=1.

The fluoroaromatic polymer would be dissolved in a mixture of methylethylketone and methylisobutyl ketone, and mixed with 7 parts by weight VC50 crosslinker (from DuPont), 1.5 parts by weight magnesium oxide (ElastoMag 170 Special available from Rohm and Hass, Andover, Mass.), 0.75 parts by weight calcium hydroxide, 0.75 parts by weight carbon black (N990 available from R. T. Vanderbilt Co.), 4.89 parts by weight Novec® FC-4430 (available from 3M) and 0.86 parts by weight AKF-290 (available by Wacker). The total solids loading in solution would be 17.5 percent. A coating formulation would be deposited onto a substrate such as silicon, aluminum, glass, or another heat-resistant substrate. It is expected that the coating would be crosslinked and cured by stepwise heating in air at temperatures between 149° C. and 232° C. for between 4 to 12 hours.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A crosslinked fluoroaromatic polymer comprising at least one polymer having fluorinated aromatic segments and the at least one polymer is selected from the group consisting of the following:

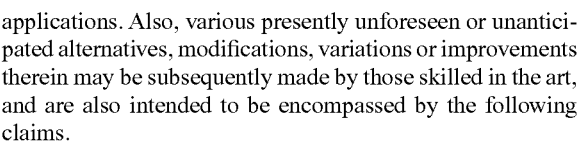

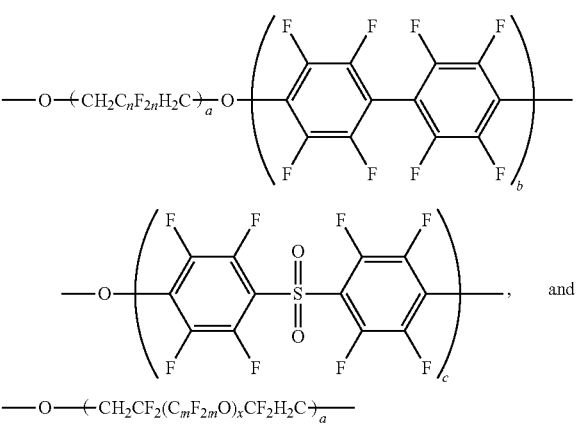

-continued

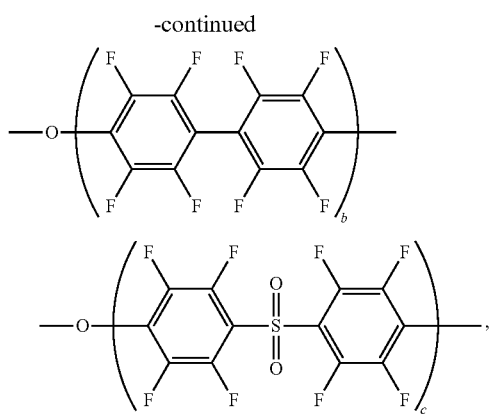

wherein $C_nF_{2n}$ and $C_mF_{2m}$ are each a linear or branched perfluorocarbon chain, n is a number of from about 1 to about 100, m is a number of from about 1 to about 6, x is a number of from about 1 to about 500, and a, b, and c are molar ratios wherein a is a number of from about 0.25 to about 0.75, b is a number of from about 0.25 to about 0.75, c is a number of from about 0.01 to about 0.25, and a+b+c=1, and wherein the crosslinked fluoroaromatic polymer is crosslinked at the fluorinated aromatic segments via a nucleophilic curing agent.

2. A crosslinked fluoroaromatic polymer of claim 1, wherein the nucleophilic curing agent is selected from the group consisting of a hydroxyphenyl, a diamine, a masked diamine, and an aminosilane.

3. The crosslinked fluoroaromatic polymer of claim 2, wherein the nucleophilic curing agent is selected from the group consisting of aminoethyl aminopropyl trimethoxysilane, hexamethylenediamine, N,N'-dicinnamylidene-1,6-hexanediamine, [3-(trimethoxysilyl)propyl]-ethylenediamine, hydroquinone, substituted hydroquinones, 2,2-bis(4-hydroxyphenyl)hexafluoropropane, and 2,2-bis(4-hydroxyphenyl)propane.

4. The crosslinked fluoroaromatic polymer of claim 1, wherein the nucleophilic curing agent is crosslinked to the fluoropolymer chains by nucleophic substitution at fluorinated aromatic segments of the fluoropolymer chains.

5. A coated member comprising a substrate, and thereover, an outer layer comprising the crosslinked fluoroaromatic crosslinked polymer of claim 1.

6. A crosslinked fluoroaromatic polymer selected from the group consisting of the following Formulas III and IV:

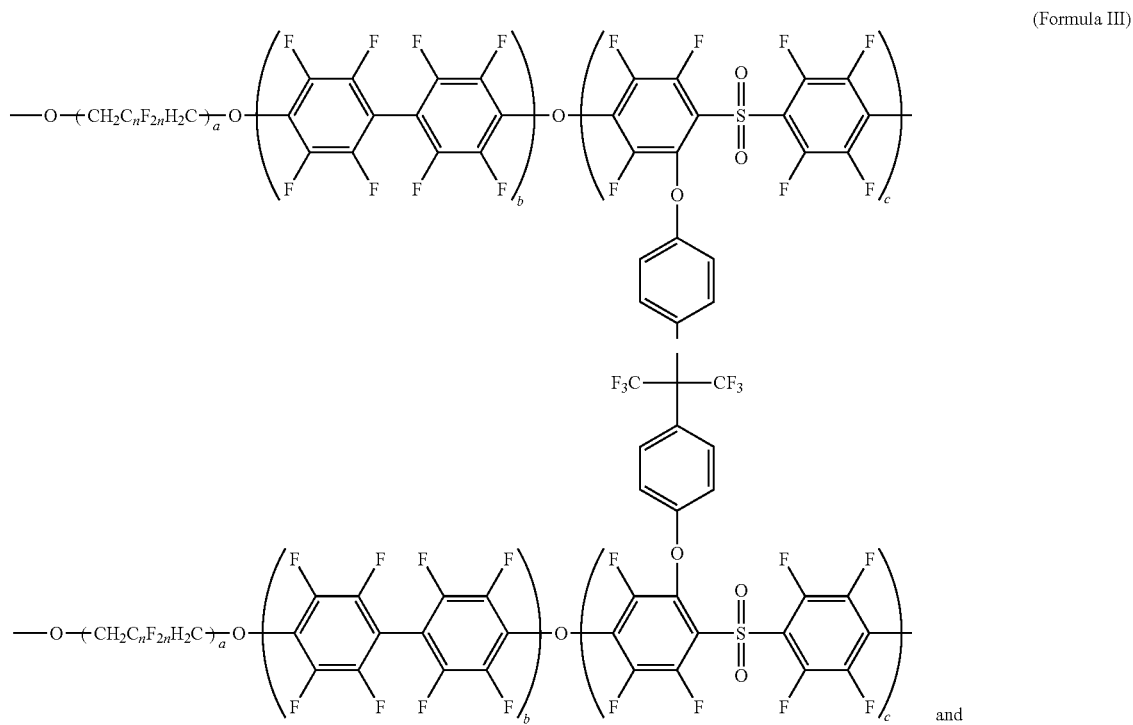

(Formula III)

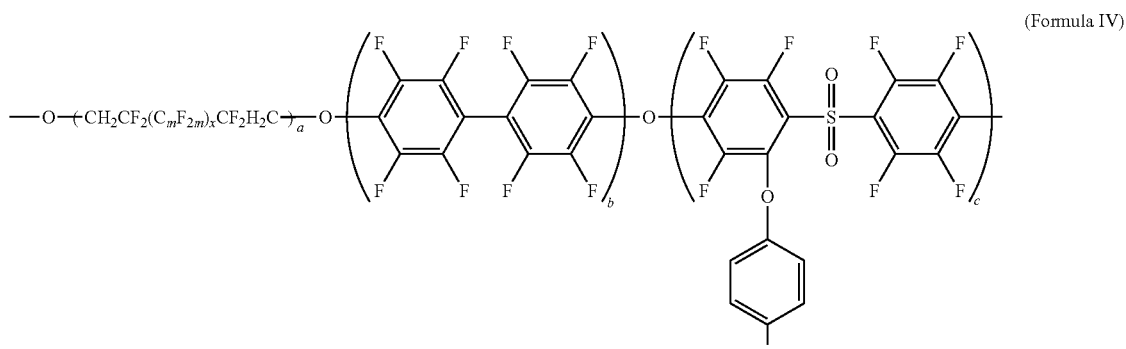

(Formula IV)

-continued

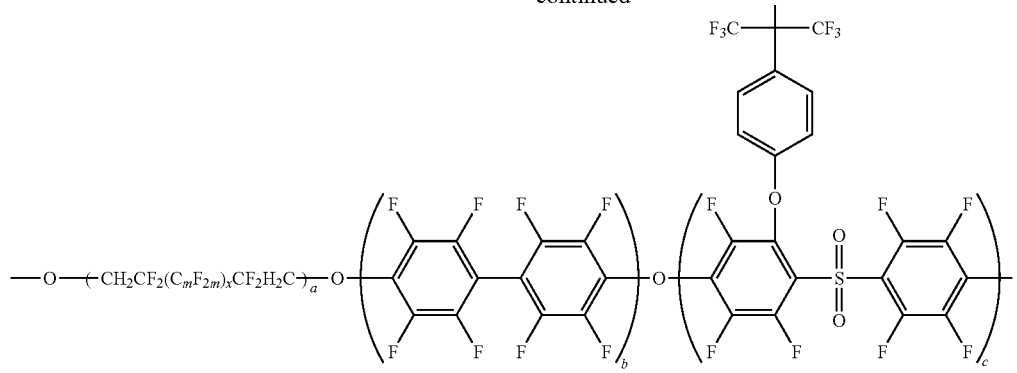

wherein in Formulas III and IV above, $C_nF_{2n}$ and $C_mF_{2m}$ are both a linear or branched perfluorocarbon chain, n is a number of from about 1 to about 100, m is a number of from about 1 to about 6, x is a number of from about 1 to about 500, and a, b, and c are molar ratios wherein a is a number of from about 0.25 to about 0.75, b is a number of from about 0.25 to about 0.75, c is a number of from about 0.01 to about 0.25, and a+b+c=1.

7. A process for producing a crosslinked fluoroaromatic polymer comprising at least one polymer having fluorinated aromatic segments and is selected from the group consisting of the following:

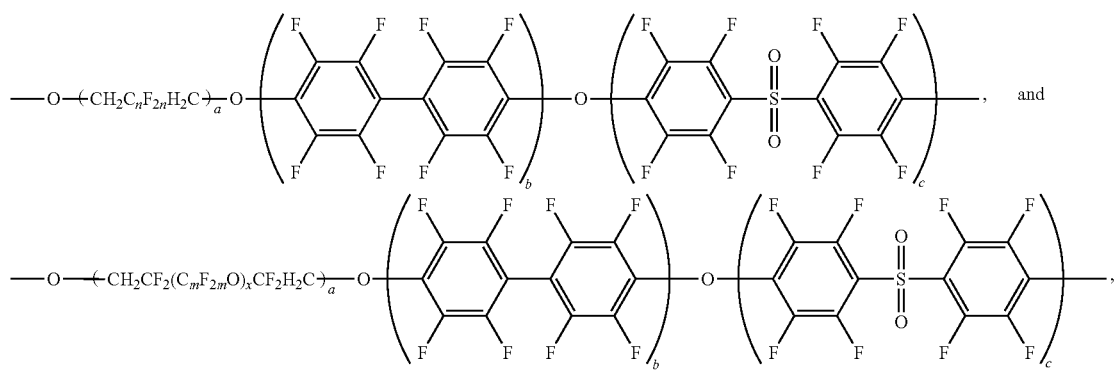

wherein $C_nF_{2n}$ and $C_mF_{2m}$ are each a linear or branched perfluorocarbon chain, n is a number of from about 1 to about 100, m is a number of from about 1 to about 6, x is a number of from about 1 to about 500, and a, b, and c are molar ratios wherein a is a number of from about 0.25 to about 0.75, b is a number of from about 0.25 to about 0.75, c is a number of from about 0.01 to about 0.25, and a+b+c=1, and wherein the crosslinked fluoroaromatic polymer is crosslinked at the fluorinated aromatic segments via a nucleophilic curing agent, said process comprising:

mixing and reacting a fluoropolymer chain and a fluorinated aromatic segment with a) a nucleophilic curing agent selected from the group consisting of a bisphenol, a diamine, a masked diamine, and an aminosilane, and b) a metal catalyst.

8. The crosslinked fluoroaromatic polymer of claim 1, wherein said polymer is crosslinked by a reaction of a perfluoroarene moiety with the nucleophilic curing agent composition at a curing temperature ranging from about 50° C. to about 300° C.

9. The crosslinked fluoroaromatic polymer of claim 8, wherein a metal oxide catalyst is further included to facilitate curing.

* * * * *